March 5, 1968  K. P. SCHUBERT ET AL  3,371,564

STAR AUTOMATIC MACHINE

Filed Oct. 4, 1965  3 Sheets-Sheet 1

INVENTORS
KARL P. SCHUBERT
JOHN L. MOLNER

Woodling, Krost,
Granger and Rust
ATTORNEYS

INVENTORS
KARL P. SCHUBERT
JOHN L. MOLNER
ATTORNEYS

United States Patent Office 3,371,564
Patented Mar. 5, 1968

3,371,564
STAR AUTOMATIC MACHINE
Karl P. Schubert, Cleveland Heights, John L. Molner, Cleveland, Ohio, assignors to The National Acme Company, a corporation of Ohio
Filed Oct. 4, 1965, Ser. No. 492,807
15 Claims. (Cl. 82—3)

ABSTRACT OF THE DISCLOSURE

The disclosure relates to a machine tool which has a turret carrying workholding spindles rotatable on horizontal axes extending radially from the vertical turret axis. The turret is indexable into positions equal to the number of spindles. A ring shaped table surrounds the turret and tool holder slide units are mounted on bases on the table. One or more of these slide units may cooperate at each spindle position and the slide units are driven by a cam which permits the slide units to be disposed at any angle in a horizontal plane for making facing, angular or lengthwise cuts on the workpieces in the turret spindles.

---

The invention relates in general to machine tools and more particular to a multiple spindle automatic machine tool arranged in the form of a star shaped turret.

In known multiple spindle automatic machine tools one customary form is to have all of the spindles with axes parallel to the axis of a spindle carrier. The spindle carrier indexes into a plurality of positions and in each of these positions machining of the workpieces carried in the spindles may be effected. Because of the fact that the spindle axes are parallel to the spindle carrier axis, the machine tool will have a certain maximum size of workpieces which can be chucked. If a larger workpiece needs to be machined, then a larger machine must be utilized and all of the parts of the machine scaled upwardly in accordance therewith. For workpieces of 2½" diameter, for example, the chuck might be about 5" or more in diameter in order to chuck these workpieces and for a six spindle machine the spindle carrier might be about 18 to 20" in diameter. This is a large massive spindle carrier which has relatively slow indexing movements.

Increasingly today cold extruded or cold formed parts are being used as workpiece blanks. These cold formed parts are partially shaped, for example, in a forging press and accordingly not much machining is needed to be done on these workpiece blanks in comparison to starting with a solid bar or hollow bar structure. The amount of machining is less and accordingly the massive strength of large machine tools is no longer of prime importance and the inherent slowness of a massive machine is a liability. Additionally cold extruded or cold formed workpiece blanks are often made of a material which produces stringy chips. Such a material is used in order to provide the proper cold forging properties. Yet upon subsequent machining in an automatic machine tool the fact that the material will readily cold forge without cracking, means that this material will machine in the form of stringy chips rather than break up into small individual chips. Such stringy chips defy the action of many chip breakers and these stringy chips foul the remaining machine operations and other operating parts of the machine tool. This is especially true where the machining area is generally in a vertical plane with chips from machining stations above fouling the machining operations at lower locations.

Accordingly an object of the invention is to provide a machine tool to obviate the above mentioned disadvantages.

Another object of the invention is to provide a machine which has the capacity to handle large workpieces relative to the size of the machine.

Another object of the invention is to provide a machine tool with the machining area disposed in a manner to prevent chips from interfering with other machining operations or moving mechanisms of the machine tool.

Another object of the invention is to provide a machine whereat all tools may be upside down to direct chips downwardly into a chip receiving area.

Another object of the invention is to provide a machine tool in which a workpiece loading and unloading station are removed from the chip producing area.

Another object of the invention is to provide a machine tool with a turret having a vertical axis and the turret carrying rotatable workholders in a plane perpendicular to this vertical axis.

Another object of the invention is to provide a machine tool on which larger diameter workpiece chucks may be mounted without mutual interference with each other.

Another object of the invention is to provide a machine tool with a central turret for workholder spindles and with movable tool holders in a machining area surrounding this turret with these tool holders mountable at any angular and peripheral position relative to a spindle position and with one or more tool holders being mountable for movement relative to a corresponding workholder position.

Another object of the invention is to provide a small compact machine with a small mass of movable parts so that it may be made considerably faster in operation for the same size of workpiece.

Another object of the invention is to provide a machine tool wherein all the tools are readily accessable.

The invention may be incorporated in a machine tool having a indexable turret journalled on a first axis on a frame, a given number of rotatable workholder spindles on a turret the axes of which are disposed in a plane perpendicular to said first axis, means connected to rotate said spindles, a plurality of toolholder units each having a base, means to mount said bases on said frame, toolholder means on each of said bases and each movable in a path in a plane perpendicular to said first axis, drive means connected to move said toolholder means generally simultaneously relative to a corresponding turret spindle position, and said mounting means mounting said bases on the frame at any angular position for movement of the respective toolholder means thereon in any angular direction relative to a corresponding turret spindle position for machining a workpiece therein.

Other objects and a fuller understanding of the invention may be had by referring to the following description and claims, taken in conjunction with the accompanying drawings, in which:

Figure 1:
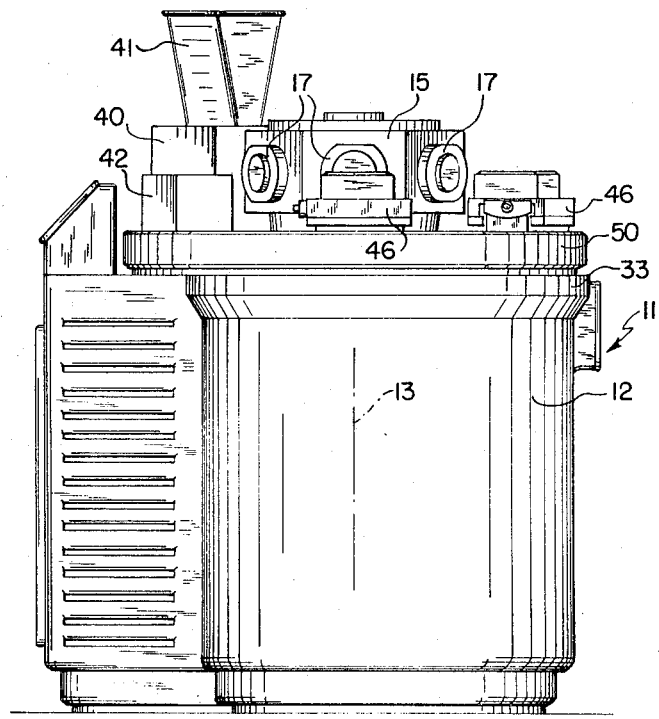
FIGURE 1 is an elevational view of a machine tool embodying the invention.

The figures of the drawing illustrate a prefered embodiment of the invention but many changes in the structure may be made, the invention being limited only by the claims appended to the specification.

Figure 2:
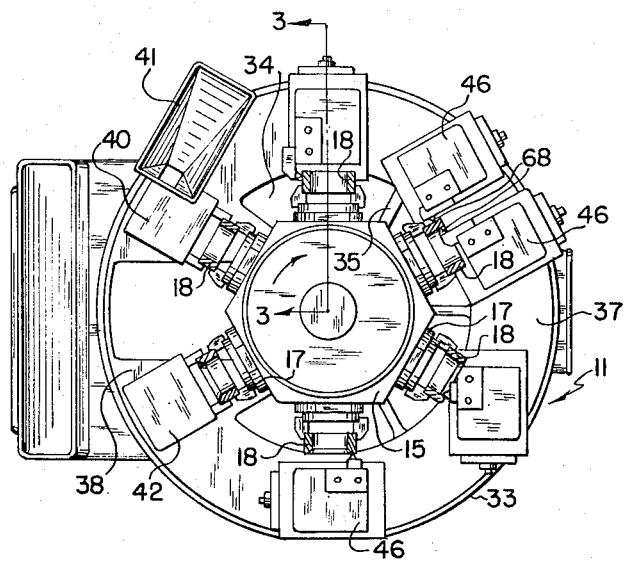
FIGURE 2 is a plan view of the machine of FIGURE 1.

FIGURES 1 and 2 show a generally overall view of a machine tool 11 incorporating the invention. This machine tool includes generally a frame 12 which has first axis 13 which preferably is vertical. A turret 15 is journalled in the frame 12 in a bearing 16, FIGURE 3. This turret may thus be indexed around the first axis 13. The turret 15 carries a plurality of workholder spindles 17, in this case shown as six in number. These workholder spindles 17 may chuck a workpiece blank 18 for rotation thereof for machining. The spindles 17 are mounted for rotation on axes in a plane perpendicular to the first axis 13 and preferably are radially disposed from the first axis 13 in a horizontal plane. Preferably these workpiece spindles 17 are equally spaced around the periphery of the turret 15.

Figure 3:
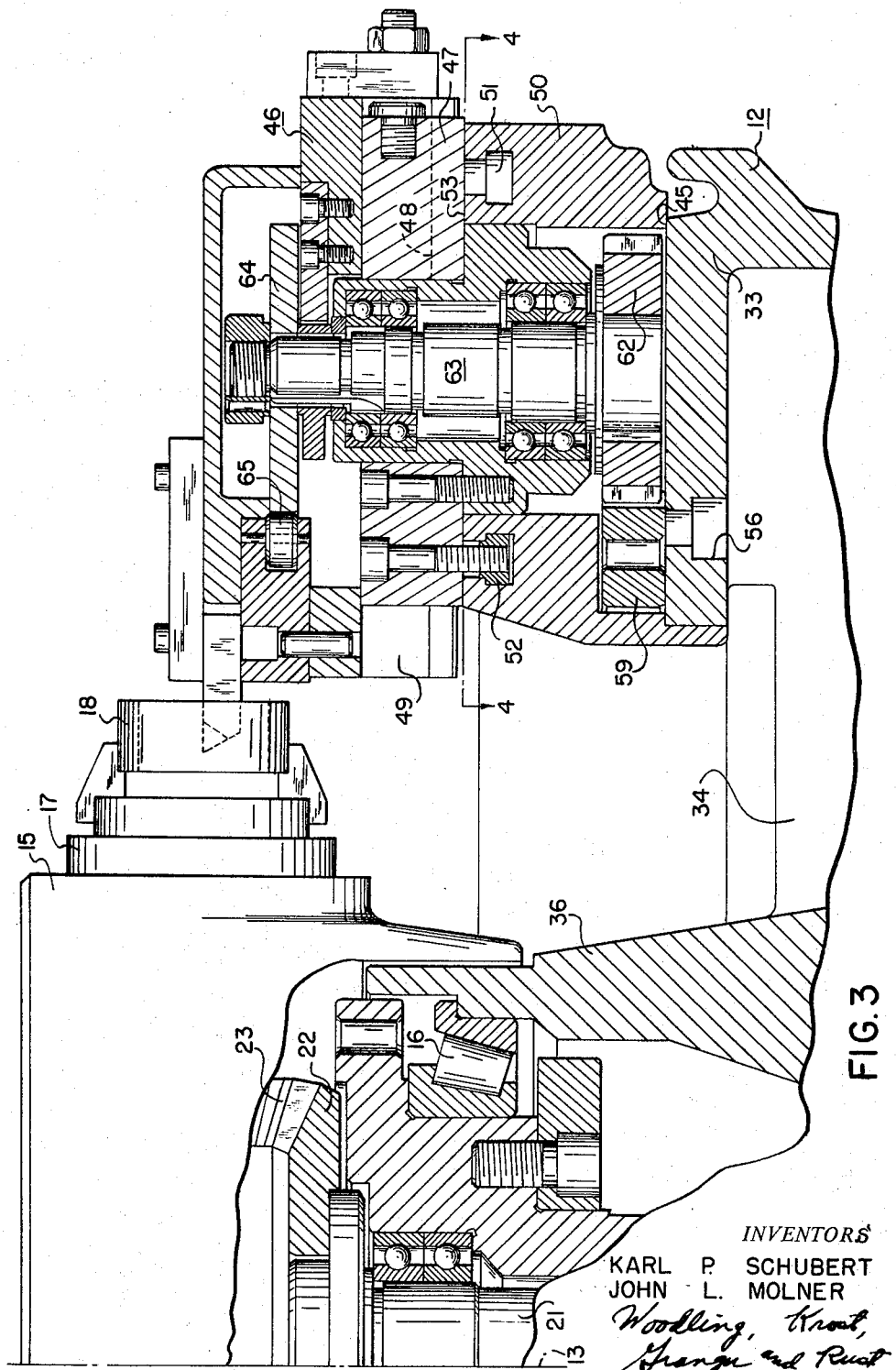
FIGURE 3 is an enlarged vertical section on line 3—3 of FIGURE 2.
Figure 4:
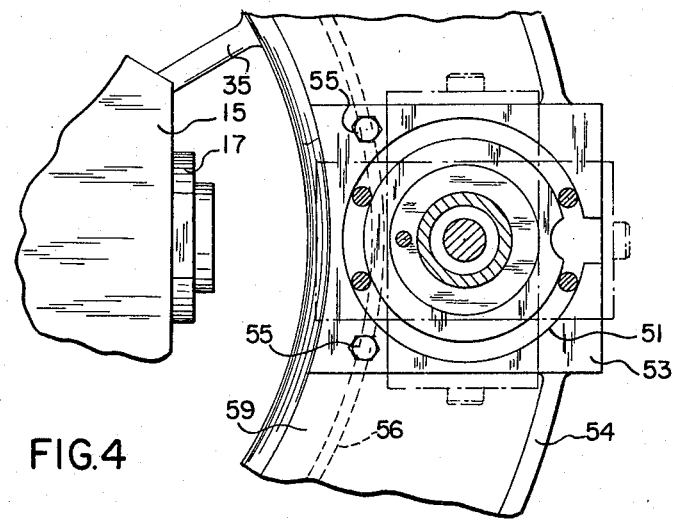
FIGURE 4 is an enlarged plan view of part of the frame with the toolholder unit removed.
Figure 5:
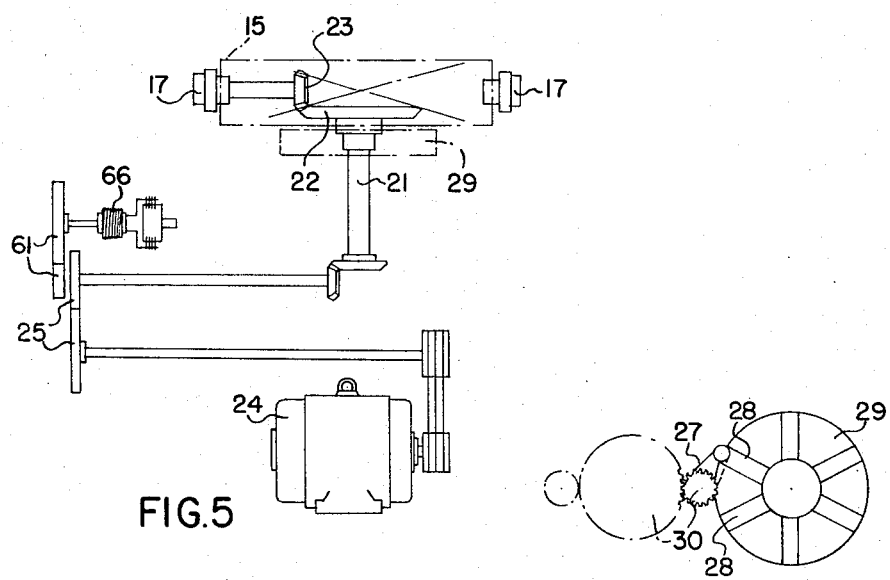
FIGURE 5 is a schematic drawing of part of the drive train.

A central drive shaft 21 is journalled in the frame 12 coaxial with axis 13, FIGURES 3, 4, and 5. A main bevel gear 22 is fixed on the shaft 21. A bevel gear 23 is fixed on each workholder spindle 17 and meshes with the main bevel gear 22 for drive of the respective spindles 17. A motor 24 is provided inside the frame 12 to drive through suitable change speed gears 25 to the central drive shaft 21.

A Geneva mechanism includes a Geneva arm 27 and Geneva slots 28. The slots 28 are provided in a plate 29 fixed to the turret 15. The Geneva arm 27 is rotated by gearing 30 from the motor 24.

A ring shaped table 33 is fixed on the frame 12 and concentrically surrounds the first axis 13 and the turret 15. The top of this table 33 is below the level of the turret 15 and is radially spaced from the turret to define an annular chip receiving area 34. Spokes 35 may be provided to join the table 33 to a central pedestal 36 of the frame 12 which supports the turret 15. As best viewed in FIGURE 2 the table 33 has a machining area 37 separate from a combined loading and unloading area. The machining area 37 in FIGURE 2 includes generally those positions on the table 33 at the twelve, two, four, and six o'clock positions. The loading area 38 includes in FIGURE 2 those stations at the eight and ten o'clock positions. A loading mechanism 40 receives workpiece blanks from a hopper 41 and loads them at a loading station at the ten o'clock position of FIGURE 2. The workpieces are loaded successively into the workholder spindles when they are indexed into this ten o'clock position, during the dwell of the turret in its indexing motion. An unloading mechanism 42 is positioned at the eight o'clock position of the table of FIGURE 2 to unload completed workpieces from the workholder spindle 17 at this corresponding eight o'clock position.

The machining area 37 is adapted to mount a plurality of tools for operating on the workpiece blanks. The table 33 has an upper mounting surface 45. A plurality of slide units or tool holder means 46 are carried on this upper mounting surface 45. FIGURE 3 better shows the construction of each of these slide units 46. Each slide unit includes a base 47 and ways 48 to slidably mount a slide 49. The base 47 may be carried on a sub-base 50 in turn carried on the upper mounting surface 45. The sub-base 50 may have a circular T-slot 51 in which headed bolts and nuts 52 are disposed for fastening the base 47 to the sub-base 50. This permits the base 47 to be mounted at any angular position relative to the sub-base 50. Accordingly it permits the slide 49 to move in any angular path relative to the corresponding spindle position. The sub-base 50 has a flat mounting surface 53 to permit this angular movement. The sub-base 50 for each slide unit 46 may be separate or they may be connected together by a ring 54 which generally covers the table 33 and the upper mounting surface 45. The sub-base 50 may be fastened to the table 33 by any suitable means such as bolts 55 extending into a large circular T-slot 56 in the table 33. This permits the sub-bases to be fastened down at any peripheral position relative to the corresponding workholder spindles 17.

A large centerless or ring gear 59 is driven from a pinion 60 driven from the motor 24 through suitable gearing including the change feed gears 61, worm 66 and worm wheel 67. Each slide unit is provided with a driven pinion 62 meshing with the ring gear 59. Each driven pinion 62 is journalled within a respective slide unit 46 on a shaft 63. This shaft has fixed thereto at the upper end a cam 64 cooperating with a cam follower 65. The cam follower 65 is fixed to the respective slide 49 so that the slide 49 will reciprocate upon rotation of the cam. Suitable springs, not shown, provide retraction of the slide 49 with the cam 64 generally providing motion toward the respective spindle 17.

The FIGURE 2 shows at the two o'clock position two slide units both mounted for operation on the corresponding workholder spindle. In the case of both of these slide units as well as all of the slide units in the machine 11, tools 68 may be mounted upside down for machining the workpiece blanks 18. These two slide units in the two o'clock position are shown as machining the O.D. and I.D. of the workpiece blank 18. The fact that the tools 68 may be mounted upside down permits any long stringy chips produced from cold extruded workpiece blanks 18 to be directed downwardly into the annular chip receiving area 34. This directly disposes of these stringy chips so that they do not foul the machining in other turret spindle positions nor do they foul other moving mechanisms of the machine tool 11. More importantly they do not foul the loading and unloading operations at the loading area 38. This is most important because with automatic loaders a chip and especially a long stringy chip making its way into all conceivable places can quickly interrupt proper positioning of a new workpiece blank 18 into the chuck of the spindle 17. Also such stringy chips can interfere with the proper discharge of completed workpieces at the unloading station 42. With the tools mounted upside down and the machining in a horizontal plane, the chips are directed immediately downwardly for the best possible disposal of these chips.

FIGURE 2 best illustrates that each of the plural faces of the turret may receive larger diameter workpiece chucks without mutual interference. This is because as the chucks would become larger in size they would also generally extend out further in a radial direction where there is more room and thus a much larger size of workpiece chucks and hence workpieces may be accommodated on this machine tool. For example, the machine tool 11 may be only about 40" in diameter across the table 33 yet workpieces of 2½ to 3" diameter may easily be accommodated as a normal operation. With larger chucks even larger workpieces may be machined.

Figure 7:
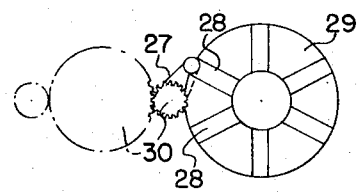
FIGURE 7 is a view on line 7—7 of FIGURE 6.
Figure 6:
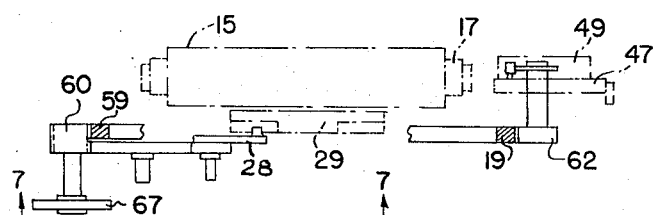
FIGURE 6 is a schematic view of another part of the drive train.

The drive train best shown in FIGURES 5, 6, and 7 shows that the Geneva mechanism 27–28 operates separately and independently from the drive means to the spindles 17. Yet it will also be noticed that during indexing, because the turret indexes through a sixty degree movement for this six faced turret, the bevel gear 23 will roll on the main bevel gear 22 and thus the spindle will rotate during this indexing movement.

FIGURE 2 illustrates that each of the slide units 46 may be mounted at various angles relative to the respective spindle position. This is because the base 47 may be swung at any angle on the sub-base 50 and fastened thereto by means of the bolts and nuts 52 in the circular T-slot 51. The slide units may be mounted for movement along a radius as shown at the twelve o'clock position of FIGURE 2, for an axially parallel cut. They may be mounted for movement along a tangent to a radius as shown at the six o'clock position of FIGURE 2 for a facing cut. They also may be mounted at any intermediate angle which is shown at the four o'clock position for an angle cut. The fact that the sub-bases 50 may be mounted at any peripheral position on the table 33 permits the two slide units 46 to be mounted at the two o'clock position of FIGURE 2. As shown at this two o'clock position the slide units may be mounted parallel to but displaced from the radial line of the respective spindle 17.

During the indexing of the turret, which may be quite rapid, one second or less, the cams 64 are preferably on a dwell portion for no movement of the slides 49. After indexing, the centerless gear 59 drives the gears 62 and cams 64 to reciprocate all slides 49 generally simultaneously for the different machining functions at each station.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and steps may be resorted to without departing from the spirit and the scope of the invention as hereinafter claimed.

What is claimed is:

1. In a machine tool having an indexable turret journalled on a first axis on a frame,
   the improvement of a given number of rotatable workholder spindles on the turret the axes of which are disposed in a plane perpendicular to said first axis,
   means connected to rotate said spindles,
   a plurality of toolholder units each having a base,
   means to mount said bases on said frame,
   toolholder means on each of said bases and each movable in a path in a plane perpendicular to said first axis,
   drive means connected to move said toolholder means generally simultaneously relative to a corresponding turret spindle position,
   and said mounting means mounting said bases on the frame at any peripheral position around said turret and in any angular position for movement of the respective toolholder means thereon in any angular direction relative to a corresponding turret spindle position for machining a workpiece therein.

2. A machine as claimed in claim 1, wherein said mounting means mounts one or more of said bases for cooperation with a particular spindle position.

3. A machine as claimed in claim 1, wherein said first axis is vertical.

4. A machine as claimed in claim 3, wherein said toolholder means can mount all tools upside down to have chips received downwardly into an annular chip receiving area surrounding the turret.

5. A machine as claimed in claim 1, wherein said spindles have axes perpendicular to said first axis and are substantially equally spaced around said first axis to receive workpiece chucks of varying size without mutual interference.

6. A machine as claimed in claim 3, including a loading station to load workpieces successively in said workholders,
   an unloading station to unload completed workpieces from said workholders,
   and said loading and unloading station being located out of the chip area of chips resulting from machining at other positions of the turret.

7. A machine as claimed in claim 1, including indexing means to index the turret,
   and said spindle rotating means establishing rotation of said workholder spindles at the time the turret is stationary and also at the time of indexing the turret.

8. A machine tool comprising, in combination,
   a frame,
   an indexable turret journalled on a first axis on said frame,
   a given number of rotatable workholder spindles on said turret the axes of which are perpendicular to said first axis,
   means connected to rotate said spindles,
   a plurality of toolholder slide units each having a base with ways thereon,
   means to mount said slide unit bases on said frame,
   a slide slidable on the ways of each base in a plane perpendicular to said first axis,
   drive means connected to move all said slides generally simultaneously relative to a corresponding turret spindle position,
   and said slide unit mounting means adjustably mounting said slide unit bases on said frame at any peripheral position around the turret and in any angular position and with one or more for a particular spindle position for movement of the respective slide thereon in any angular direction relative to a corresponding turret spindle position for machining a workpiece therein.

9. A machine tool comprising, in combination,
   a frame,
   a turret journalled on a first axis on said frame,
   a given number of rotatable workholder spindles on said turret the axes of which are perpendicular to said first axis and equally spaced around said first axis,
   drive means and a drive train connected to rotate all of said spindles,
   means to index said turret into positions equal in number to said given number of positions,
   a plurality of toolholder slide units each having a base with ways thereon,
   means to mount said slide unit bases on said frame,
   a slide slidable on the ways of each base in a plane perpendicular to said first axis,
   a cam in each slide unit base having an axis of rotation perpendicular to the corresponding spindle axis,
   a cam follower on each slide cooperating with said cam,
   drive means including said cam and follower establishing movement of each slide,
   and said slide unit mounting means mounting said slide unit bases on said frame at any angular position for movement of the respective slide thereon by said cam and follower in any angular direction relative to a corresponding turret spindle position to machine a workpiece thereat.

10. A machine tool comprising, in combination,
    a frame,
    a turret journalled on a first axis on said frame,
    a given number of rotatable workpiece spindles on said turret the axes of which are perpendicular to said first axis and equally spaced around said first axis,
    means to index said turret into positions equal in number to said given number of positions,
    a plurality of slide units each having a base with ways thereon,
    means to pivotally mount said slide unit bases on said frame about respective second axes,
    a slide slidable on the ways of each base in a plane perpendicular to said first axis,
    a drive train connected to move each slide relative to the respective base and relative to a corresponding turret spindle position to machine a workpiece thereat,
    said drive train including a cam in each slide unit base having the respective second axis as the axis of rotation of the cam,
    said drive train further including a cam follower on each slide cooperating with the respective cam,
    and said slide unit mounting means mounting said slide unit bases with at least two slides for one particular spindle position for movement of each respective slide thereon by said cam and follower in any angular direction relative to a corresponding turret spindle position for machining a workpiece therein.

11. A machine tool comprising, in combination,
a frame,
a turret journalled on a first axis on said frame,
a given number of rotatable workpiece spindles on said turret the axes of which are perpendicular to said first axis and equally spaced around said first axis,
drive means and a first drive train connected to rotate all of said spindles,
means to index said turret into positions equal in number to said given number of positions with said drive train establishing rotation of each of said spindles in accordance with the indexing movement,
a plurality of slide units each having a base with ways thereon,
means to mount said slide unit bases on said frame,
a slide slidable on the ways of each base in a plane perpendicular to said first axis,
a cam in each said slide unit base,
a cam follower on each said slide cooperating with said cam,
a second drive train connected to drive all of said cams,
tool mounting means carried on each of said slides for mounting tools upside down to direct machined chips downwardly,
rotation of each cam establishing movement of the respective slide relative to the respective base and relative to a corresponding turret spindle position to machine a workpiece thereat,
and said slide unit mounting means mounting said slide unit bases on said frame at any peripheral position and in any angular position and with one or more for a particular spindle position for movement of the respective slide thereon in any angular direction relative to a corresponding turret spindle position for machining a workpiece therein.

12. A multiple spindle automatic machine tool comprising, in combination,
a frame,
a plural faced turret journalled on a vertical axis on said frame for indexing movements into positions equal in number to the number of faces and equally spaced relative to said frame,
a rotatable spindle on each turret face the axes of which are horizontal and equally spaced around said vertical axis,
a central drive shaft coaxial with said vertical axis,
a main gear fixed on said drive shaft,
a gear fixed to each said spindle and meshing with said main gear,
means to drive said drive shaft to rotate all of said spindles,
means to index said turret into said plural positions with said gears establishing rotation of each of said spindles in accordance with the indexing movement,
a ring-shaped table horizontally surrounding said turret, and below said turret on top of said frame,
a machining area on said table,
a ring gear carried in said table for rotation about said vertical axis,
a plurality of slide units each having a base with ways thereon,
means to mount said slide unit bases on said table in said machining area,
a driven gear in each slide unit base meshing with said ring gear for drive therefrom,
a cam fixed to and driven by the gear in each said slide unit,
slides slidable on said ways,
a cam follower on each said slide cooperating with said cam,
rotation of said cam establishing movement of said slide relative to the respective base and relative to a corresponding turret spindle position,
tool mounting means carried on each of said slides for mounting tools upside down to direct machined chips downwardly,
and said slide unit mounting means mounting said slide unit bases on the top of said table at any peripheral position and in any angular position for movement of said slides thereon in any angular direction relative to a corresponding turret spindle position for machining of a workpiece therein.

13. A multiple spindle automatic machine tool comprising, in combination,
a frame,
a six faced turret journalled on a vertical axis on said frame for indexing movements into six equally spaced positions relative to said frame,
a rotatable spindle on each turret face the axes of which are horizontal and equally spaced around said vertical axis to receive workpiece chucks of varying size without mutual interference,
a central drive shaft vertical and coaxial with said vertical axis,
a main bevel gear fixed on said drive shaft,
a bevel gear fixed to each said spindle and meshing with said main bevel gear,
means to drive said drive shaft to rotate all of said spindles,
a Geneva mechanism connected to said turret independently of said drive shaft and gears to index said turret into said six positions with said gears establishing rotation of each of said spindles in accordance with the indexing movement,
a ring-shaped table horizontally surrounding said turret and below said turret on top of said frame,
a machining area on said table,
a loading station and an unloading station on said table remote from said machining area to be free from all machining chips thereat,
means at said loading station to load individual workpieces into each of said spindles as said spindles are indexed by said turret to a position adjacent said loading station,
means at said unloading station to unload completed workpieces from each of said spindles as said spindles are indexed by said turret to a position adjacent said unloading station,
a plurality of slide units each having a base fixed on said table in said machining area,
a ring gear carried in said table for rotation about said vertical axis,
means to drive said ring gear,
a driven gear in each slide unit base meshing with said ring gear for drive therefrom,
a cam fixed to and driven by the gear in each said slide unit,
ways on each said slide unit base,
slides slidable on said ways in a horizontal plane,
a cam follower on each said slide cooperating with said cam,
rotation of said cam establishing movement of said slide relative to the respective base and relative to a corresponding turret spindle position,
an annular chip receiving area surrounding said turret and inside said ring-shaped table,
tool mounting means carried on each of said slides for mounting tools upside down to direct machined chips downwardly into said annular chip receiving area,
and means to mount said slide unit bases on the top of said table at any peripheral position and in any angular position and with one or more for a particular turret spindle position for movement of said slides thereon in any angular direction relative to the corresponding turret spindle position for machining of a workpiece therein.

14. A machine tool as set forth in claim 9, wherein said slide unit mounting means mounts said slide unit bases on said frame at any angular position in a plane containing said spindle axes,
   said cam follower being thereby positionable at any angular position in the plane of the spindle axes for cooperation with said cam.

15. A machine tool as set forth in claim 9, wherein said cam is a disc cam having a variable radial dimension cooperating with said cam follower.

References Cited

UNITED STATES PATENTS

| | | | |
|---|---|---|---|
| 1,877,174 | 9/1932 | Head | 82—19 |
| 2,202,287 | 5/1940 | Groene | 82—19 |
| 1,389,216 | 8/1921 | Potter | 29—36 |
| 1,496,794 | 6/1924 | Van Hamersveld | 29—38.1 |
| 1,933,500 | 10/1933 | Spring | 29—38 |
| 2,817,990 | 12/1957 | Miller | 82—3 |

LEONIDAS VLACHOS, *Primary Examiner.*